United States Patent [19]

Coppock

[11] 4,126,834
[45] Nov. 21, 1978

[54] BULK WAVE BRAGG CELL

[75] Inventor: Richard A. Coppock, San Jose, Calif.

[73] Assignee: GTE Sylvania Incorporated, Mountain View, Calif.

[21] Appl. No.: 810,180

[22] Filed: Jun. 27, 1977

[51] Int. Cl.$^2$ ............................ H01S 3/10; G02F 1/32
[52] U.S. Cl. .................................. 332/7.51; 350/358; 250/199
[58] Field of Search ................... 332/7.51; 350/161 R, 350/161 W; 250/199

[56] References Cited

U.S. PATENT DOCUMENTS

| | | | |
|---|---|---|---|
| 3,055,258 | 9/1962 | Hurvitz | 350/161 W |
| 3,495,894 | 2/1970 | Lenzo et al. | 350/161 W |
| 3,736,045 | 5/1973 | Heidrich et al. | 350/161 W |
| 3,856,378 | 12/1974 | Brandt et al. | 350/161 W |
| 4,087,764 | 5/1978 | Young | 331/94.5 M |

OTHER PUBLICATIONS

Shah, "Fast Acoustic Diffraction-Type Optical Waveguide Modulator", 11/15/73, pp. 556–568, Appl. Phys. Lett., vol. 23, #10, G-250.
Yano et al., "TeO$_2$ Anisotropic Bragg Light Deflectors . . .," 1/15/75, App. Phys. Lett., vol. 26, #12, pp. 689–691, G-250.
Mitchell, "Spurious Bulk Wave Signals in Acoustic Surface Wave Devices", 11/74, pp. 313–320, IEEE Ultrasonics Symposium.

Primary Examiner—Nelson Moskowitz
Attorney, Agent, or Firm—John F. Lawler

[57] ABSTRACT

An acousto-optic bulk wave Bragg cell having a transparent piezoelectric body and a single-layer interdigital transducer (IDT) signal input array on one surface of the body is adapted to be connected to a microwave (> 1 GHZ) energizing source for launching primarily bulk shear acoustic waves in the body transversely of the plane of the input surface. This Bragg cell is a signal transducer which converts the microwave input signal into an optical wavefront having spatial modulation directly proportional to the input signal and is utilized to diffraction modulate a laser beam directed through the cell transversely of the direction of acoustic wave propagation.

1 Claim, 5 Drawing Figures

BULK WAVE BRAGG CELL

BACKGROUND OF THE INVENTION

This invention relates to transducers and more particularly to an improved construction of an acousto-optical transducer (Bragg cell).

It is known that bulk acoustic waves, primarily longitudinal waves, are generated in a Bragg cell by the application of microwave energy to the cell. (Bulk waves are comprised of longitudinal waves, defined by particle motion in the direction of wave propagation, and shear waves in which particle motion occurs transversely of the direction of propagation). In accordance with prior practice, microwave energy is applied to a multi-layer thin-film zinc oxide (ZnO) interdigital transducer deposited on the body of the cell or, alternatively, to an ion-polished piezoelectric crystal bonded to the cell body. Both approaches have major difficulties, particularly in capital investment and fabrication skill requirements.

It is also known in the prior art that a transverse electric field applied to the surface of a piezoelectric body excites bulk shear waves in the body. This is the characteristic of a prior art device having a plate-like electrode on one surface of the piezoelectric body connected to a microwave energizing source. The purpose of such devices is to measure the properties of the material by such well-known techniques as the Schaefer-Bergmann process described in an article entitled "Dielectric Materials for Device Application" by Spencer et al, Proceedings of IEEE, Vol. 55, No. 12, Dec. 1967, pages 2105-07.

Finally, surface acoustic wave (SAW) devices are well known in which surface (Rayleigh) acoustic waves are launched and received by IDT conductive arrays applied at spaced locations to the surface of an acoustic medium, such as a piezoelectric crystal. These devices typically are used as delay lines for low frequency RF signals in the 50-400 MHz range, the acoustic wave propagating along and adjacent to the medium surface from the input IDT to the output IDT.

This invention is directed to an improved microwave Bragg cell construction involving a novel combination of the foregoing principles.

OBJECTS AND SUMMARY OF THE INVENTION

An object of the invention is the provision of a Bragg cell having a simplified transducer design.

A further object is the provision of a Bragg cell having efficient, broadband (~1 GHz bandwidth) acoustic-wave generation characteristics.

Still another object is the provision of a Bragg cell with an input transducer having a relatively high impedance, permitting simple, broadband RF electrical matching.

Another object is the provision of a Bragg cell capable of generating shear waves having a low velocity providing higher diffraction efficiency and longer cell aperture time than do longitudinal waves.

A further object is the provision of a Bragg cell in which the polarization of light diffracted therein is rotated via shear waves thereby permitting increased dynamic range through background rejection.

These and other objects of the invention are achieved with a Bragg cell having an IDT conductive array as a means of coupling microwave energy, i.e., > 1 GHz, into the body of the cell for generating primarily bulk shear waves to spatially modulate a laser beam traversing the cell.

DESCRIPTION OF PREFERRED EMBODIMENT

Figure 1:
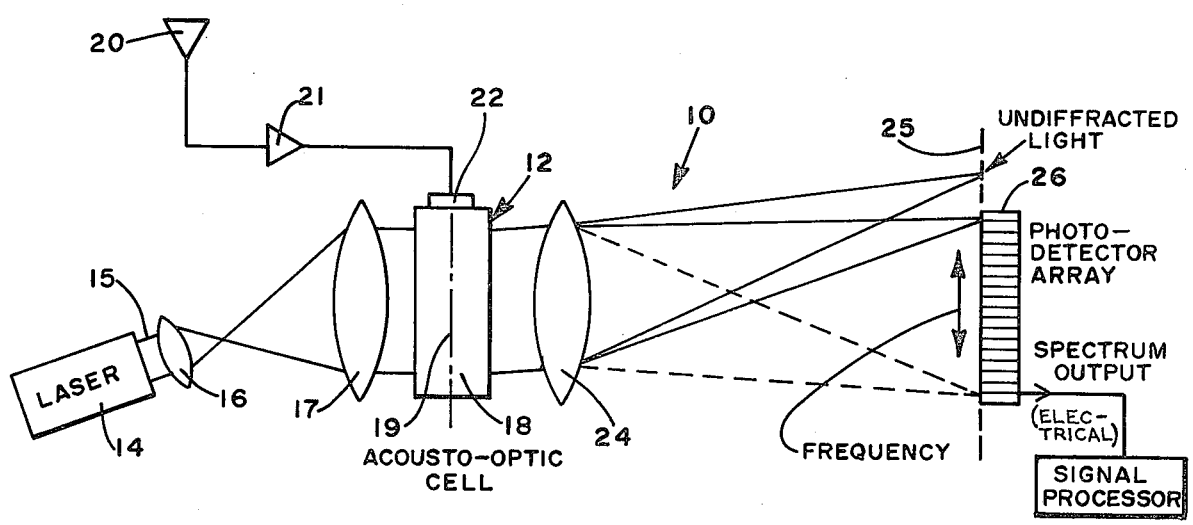
FIG. 1 is a schematic diagram of a microwave receiving system utilizing a Bragg cell and exemplary of a typical application of such a cell embodying this invention.

Referring now to the drawings, FIG. 1 illustrates a microwave receiving system 10 as an example of an application of an acousto-optic or Bragg cell 12 embodying the invention and comprises a laser 14 having an output beam 15 directed by lenses 16 and 17 through the transparent body 18 of cell 12 transversely of its longitudinal axis 19. Microwave signals received by antenna 20 and amplified by amplifier 21 are applied to a transducer 22 on the end surface of cell 12 and launch acoustic waves in the cell body 18 in the direction of axis 19. The output beam from cell body 18 is focused by Fourier transform lens 24 on transform plane 25 in which a photodetector array 26 is located. The laser beam is spatially modulated, i.e., diffracted, by the acoustic waves in body 18 to a degree corresponding to the frequency of the input signal and is incident on cells of photodetector array 26 which produces an output that is the electrical analog of the signal frequency spectrum. This output is then appropriately processed in utilization apparatus such as a processor 28.

The above described system is well known in the art and does not per se constitute this invention which is directed to the particular construction of cell 12 as described below.

Figure 2:
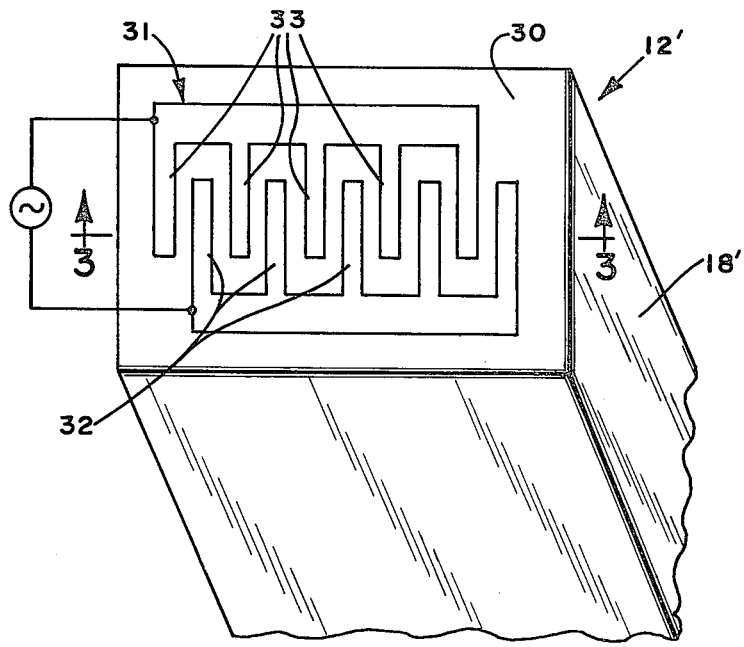
FIG. 2 is a perspective view of part of a Bragg cell embodying this invention showing the structure of the IDT array.
Figure 3:
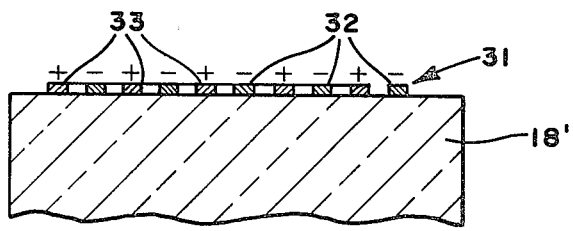
FIG. 3 is a transverse section taken on line 3—3 of FIG. 2.

An acousto-optic cell 12' embodying this invention is shown in FIGS. 2 and 3 and comprises a transparent piezoelectric substrate or body 18' having a smooth surface 30 on which is deposited an IDT array 31 having a first set of electrodes 32 and a second set of electrodes 33 disposed in mutually overlapping spaced relation. Transducer 31 is a conductor such as gold formed as a single layer on the body surface by well known thin-film deposition techniques. The spacing of electrodes 32 and 33 corresponds to that appropriate for launching Rayleigh or surface acoustic waves (SAW) in prior art SAW devices such as delay lines, i.e., a half wavelength at the operating frequency for launching such waves.

Figure 4:
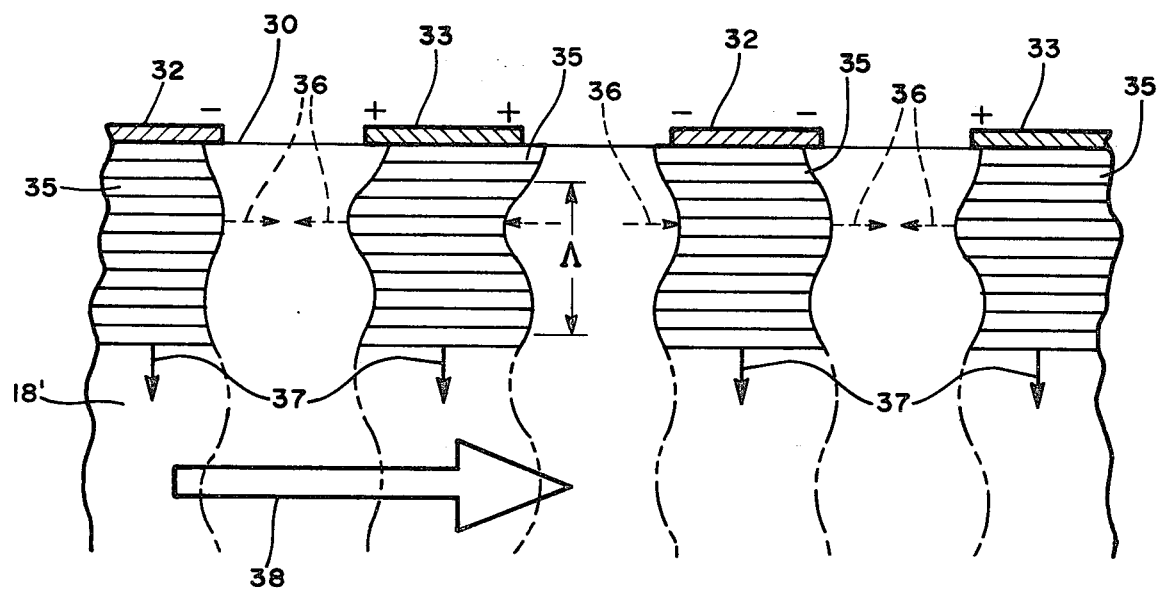
FIG. 4 is an enlarged view of part of FIG. 3 (omitting the cross-sectioning of the cell body) illustrating schematically the bulk shear waves propagating in the cell body.
Figure 5:
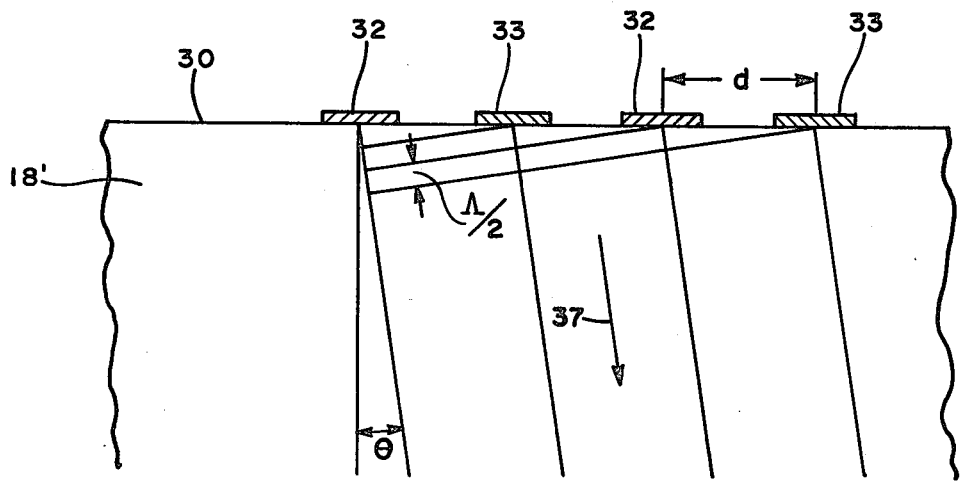
FIG. 5 is a view similar to FIG. 4 illustrating one of two composite acoustic beams and its angle of propagation in the cell body.

I have discovered this interdigital transducer 31 is particularly advantageous for generating bulk shear waves in the piezoelectric body 18' of Bragg cell 12' as shown in FIGS. 4 and 5. Bulk shear waves are represented schematically as wavy bands 35 and are excited by the electric fields under each of the electrodes 32 and 33. These waves are produced by particle displacement as indicated by the broken line arrows 36 in FIG. 4, the direction of propagation of the waves being nominally normal to surface 30 as indicated by the solid line arrows 37. The transverse arrow 38 represents the direction of propagation of the laser beam through the cell, the beam being diffraction-modulated by the shear waves. A principal advantage of shear waves as the optical modulating mechanism in body 18' is high diffraction efficiency as compared to longitudinal waves (typically on the order of 8 times greater).

The bulk shear waves are coherently reinforced for a direction of propagation approaching a normal to the surface 30 of the cell body as illustrated in FIG. 5. Since the particle displacement is opposite for adjacent acoustic beams, the propagation direction 37 is given by $$\theta = \sin^{-1}\frac{(\Lambda/2)}{d}$$

where
$\Lambda$ = acoustic wavelength
$d$ = electrode spacing.

More particularly, two first-order composite beams are formed symmetrically about the normal to the surface 30. These beams change or "steer" in angle $\theta$ with frequency changes the angle $\theta$ diminishing with an increase in frequency. One beam (at a time) can be utilized to steer at a rate which tracks the Bragg angle, thus assuring efficient diffraction over large changes in frequency (large bandwidths).

By way of example, a Bragg cell embodying this invention and having the following features and performance characteristics has been built and successfully operated:

| Material | Lithium niobate |
|---|---|
| $\Lambda$ | $\approx 1\,\mu$ |
| $\theta$ | $\approx 5°$ |
| d | $13\,\mu$ |
| Operating band | 2.5 to 3.5 GHz (instantaneous) |

What is claimed is:

1. In combination
   an acousto-optic Bragg cell device comprising
      a transparent piezoelectric body having a smooth surface, and
      a single-layer interdigital transducer (IDT) conductive array deposited on said surface,
   a source of microwave energy connected to said array whereby to launch bulk acoustic waves into said body transversely of said surface,
   said bulk waves comprising shear waves propagating in a plane extending transversely of said surface,
   laser apparatus having an output beam directed through said body transversely of the direction of propagation of and in said plane of said shear waves whereby said beam is diffraction-modulated by said acoustic waves and is deflected in said plane through an angle proportional to the frequency of the microwave energy, and
   utilization apparatus responsive to said diffraction-modulated beam.

* * * * *